Figure 1:
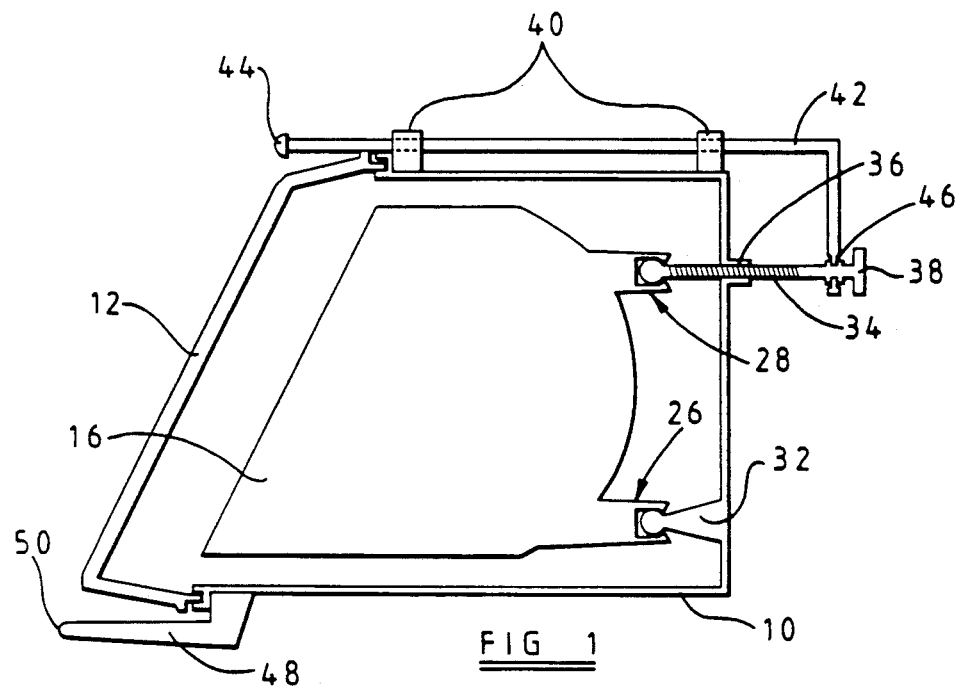

United States Patent [19]

Birt

[11] Patent Number: 5,060,127
[45] Date of Patent: Oct. 22, 1991

[54] MOTOR VEHICLE HEADLAMP

[75] Inventor: David A. Birt, Cannock, England
[73] Assignee: Carello Lighting Plc., United Kingdom
[21] Appl. No.: 669,741
[22] Filed: Mar. 1, 1991
[51] Int. Cl.$^5$ ............................................. F21M 3/20
[52] U.S. Cl. ............................ 362/421; 362/66; 362/80; 362/273; 362/289; 362/428
[58] Field of Search .............. 362/61, 66, 80, 269, 362/273, 285, 289, 418, 419, 420, 421, 422, 427, 428

[56] References Cited

U.S. PATENT DOCUMENTS

| | | | |
|---|---|---|---|
| 4,363,085 | 12/1982 | Demas | 362/80 |
| 4,628,414 | 12/1986 | Ricard | 362/427 |
| 4,751,619 | 6/1988 | Philippe et al. | 362/80 |

Primary Examiner—Ira S. Lazarus
Assistant Examiner—Sue Hagarman
Attorney, Agent, or Firm—Andrus, Sceales, Starke & Sawall

[57] ABSTRACT

To facilitate aiming of a motor vehicle headlamp, e.g. as specified in U.S. Lighting Standard SAE J602, a motor vehicle headlamp having a housing with a light-transmitting front cover and a lamp reflector body mounted completely within the housing has an abutment carried by a rod at the top of the headlamp. The rod is slidable in bearings and connected with an adjusting screw for the lamp reflector body so that adjustment of the screw also moves the rod. A conventional mechanical headlamp aimer in mounted on the light-transmitting front cover of the housing in known manner and engages against the abutment.

9 Claims, 3 Drawing Sheets

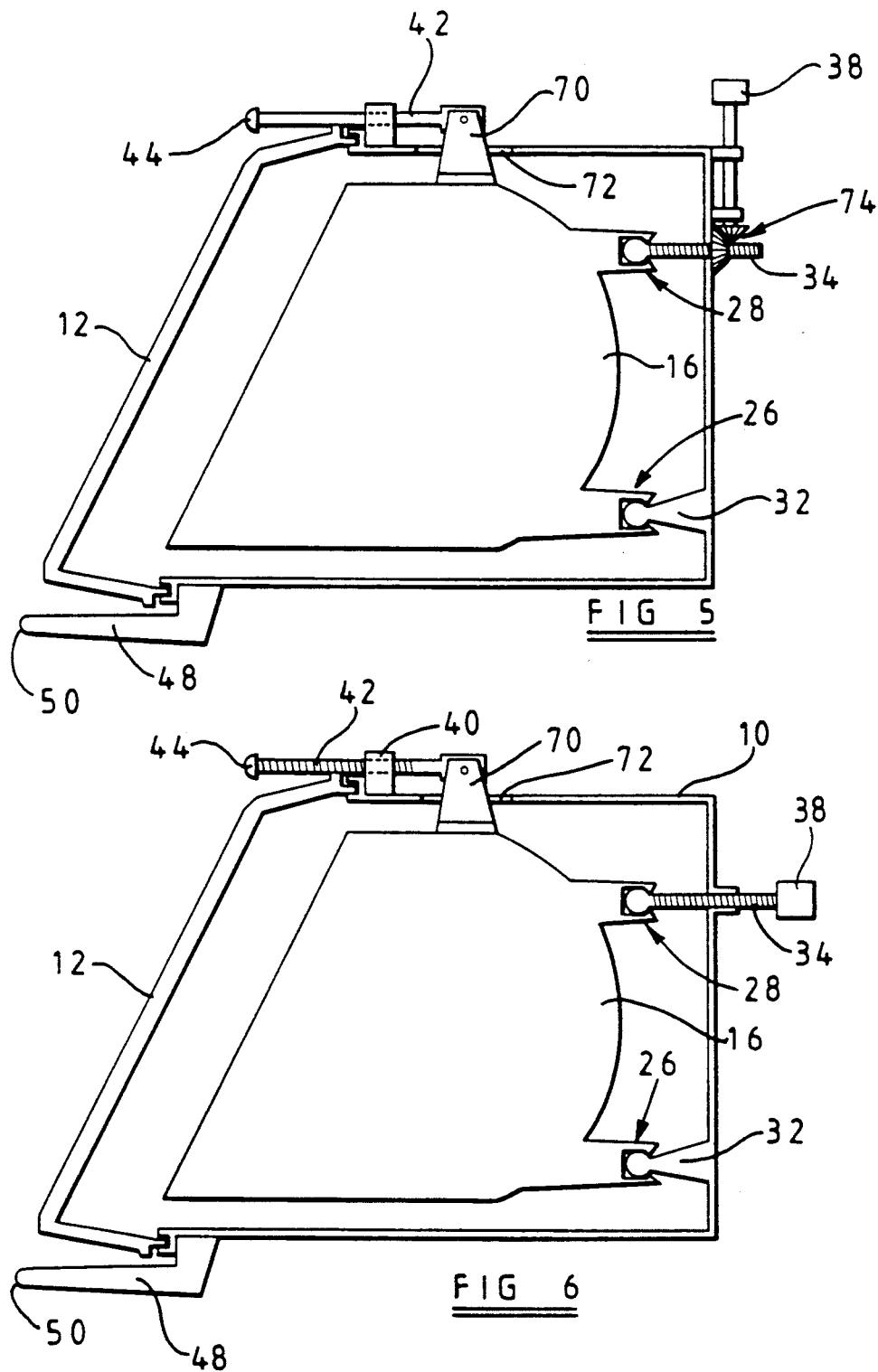

MOTOR VEHICLE HEADLAMP

This invention relates to a motor vehicle headlamp and is more particularly concerned with a headlamp of the type in which a lamp reflector body is adjustably mounted within a housing which includes a light-transmitting front cover and which, in use, is fixed relative to the motor vehicle. Such a headlamp will be referred to hereinafter as a headlamp of the fixed housing type.

It is an object of the present invention to provide a headlamp of the fixed housing type wherein aiming of the lamp reflector body is made possible without visual reference to the beam.

According to the present invention, there is provided a headlamp comprising a housing including a light-transmitting front cover, the housing being adapted to be fixed to a motor vehicle, a lamp reflector body mounted within the housing, and mounting means operatively connected between the lamp reflector body and the housing for adjustably mounting the lamp reflector body within the housing, said mounting means including an adjuster which is connected with the lamp reflector body so that adjustment thereof tilts the lamp reflector body about a substantially horizontal axis, characterised in that an element is mounted externally of the housing and connected for movement with the lamp reflector body, said element extending forwardly of the housing and mounting an abutment which is disposed at the front of the housing, whereby the position of the abutment relative to the housing is dependant upon the tilted position of the lamp reflector.

With such an arrangement, it will be appreciated that the position of the abutment in the fore-aft direction relative to the housing provides an indication of the position of tilt of the reflector body about the horizontal axis. Such an abutment can therefore be used in conjunction with a mechanical headlamp aimer, for example as specified in US Lighting Standard SAE J602. In order to facilitate this, an adaptor is provided which can be temporarily pivotally mounted on the headlamp, e.g. by means of a suction pad engaging the light-transmitting front cover of the housing, said adaptor having a surface adapted to engage against said abutment so that tilting of the lamp reflector body by operating the adjuster produces a corresponding tilting movement of the adaptor and part of the mechanical aimer attached thereto in use.

Said element may be connected with the lamp reflector body via a portion of the adjuster which is disposed externally of the housing, or it may be connected with the lamp reflector body via a member which is mounted on the lamp reflector body and which extends through a slot provided in the housing. In such an event, sealing means will normally be provided to seal the housing around the slot to prevent ingress of moisture, dirt and other contaminants.

In one embodiment, the element comprises an L-shaped rod having one limb slidably mounted in least one bearing mounted on the housing, the other limb being engaged with the adjuster which is normally in the form of a screw-threaded rod mounted in an internally screw-threaded bush fixed relative to the housing, said screw-threaded rod acting against the lamp reflector body.

In another embodiment, the element comprises a rod slidably mounted in a bearing mounted on the housing and pivotally attached to part of a flange which is secured to the reflector body, said part being that which projects externally of the housing.

Most preferably, the abutment and element carrying the same are provided at the top of the housing, whilst a fixed abutment for the adaptor is provided at the bottom of the housing.

Figure 2:
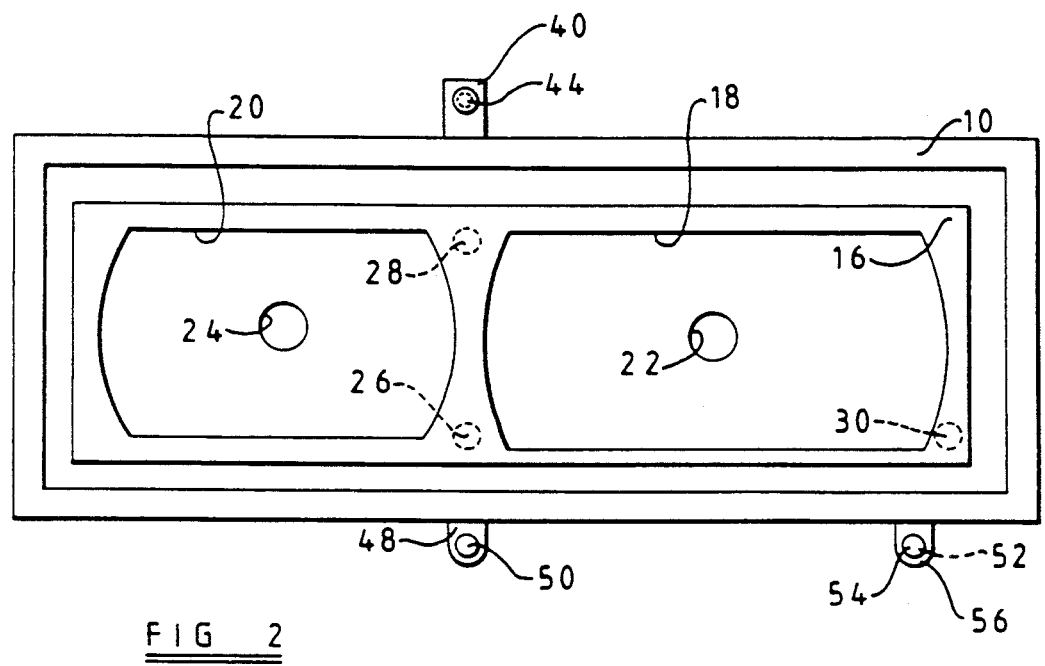
Figure 3:
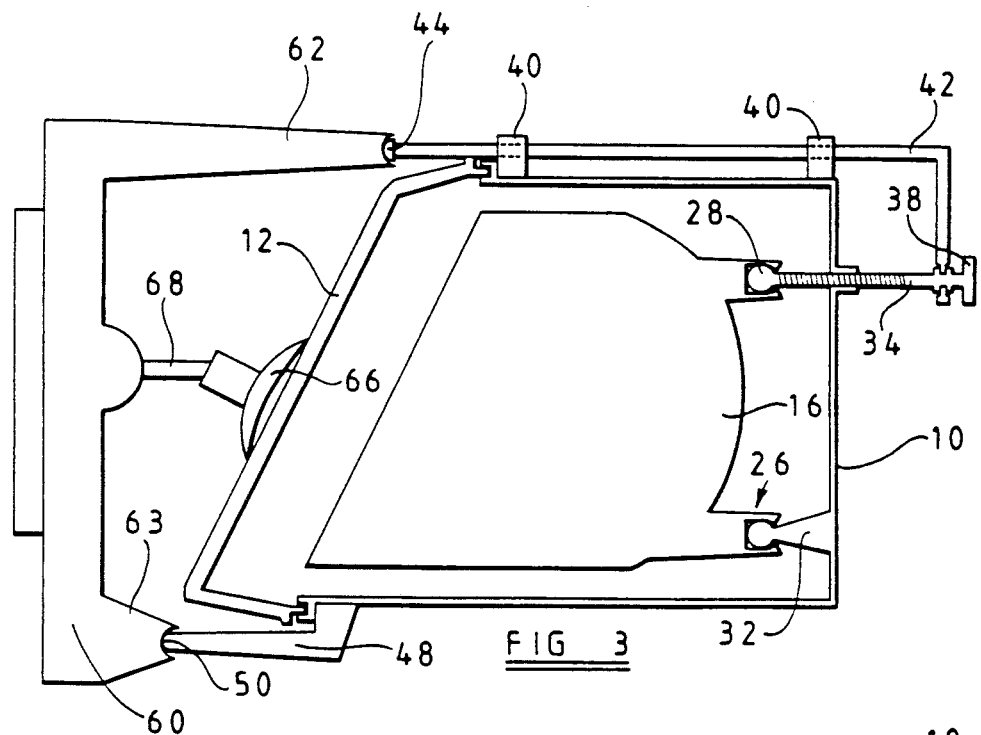
Figure 4:
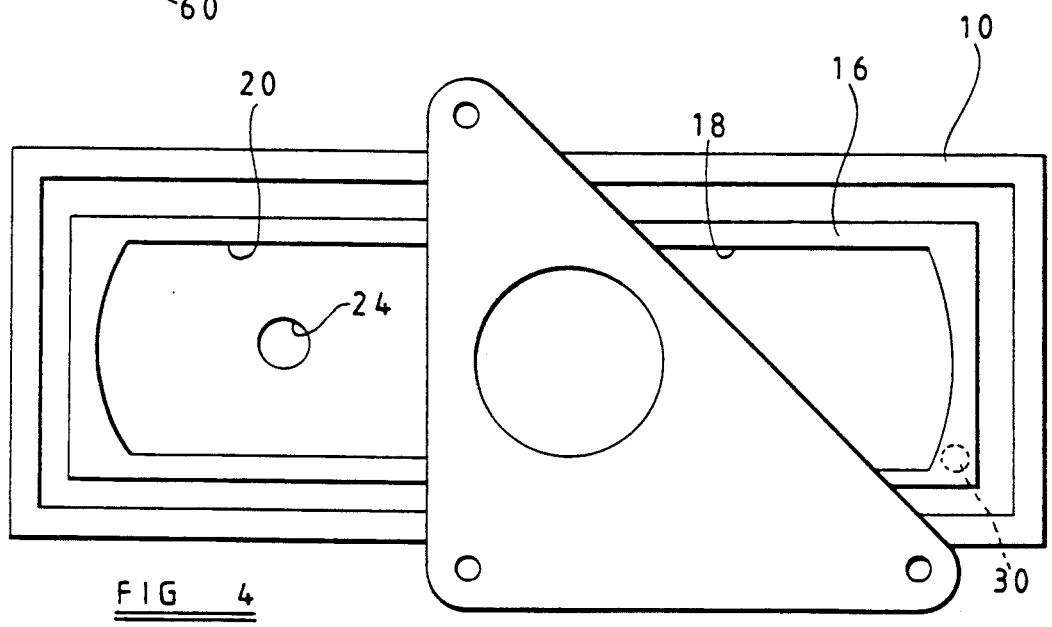

Embodiments of the present invention will now be described, by way of example, with reference to the accompanying drawings in which:

FIGS. 1 and 2 are schematic sectional and front elevational views of one embodiment of motor vehicle headlamp according to the present invention, FIGS. 3 and 4 are corresponding views of the headlamp of FIGS. 1 and 2 with an attached headlamp aiming adaptor, and FIGS. 5 and 6 are schematic sectional views of second and third embodiments of motor vehicle headlamp reflector according to the present invention.

Referring now to FIGS. 1 and 2, the motor vehicle headlamp is of the fixed housing type in that it comprises a housing 10 which is adapted to be fixedly mounted at the front of the motor vehicle and includes a light-transmitting front cover 12 which is sealingly secured to the remainder of the housing 10. The headlamp further comprises a lamp reflector body 16 which, in this embodiment, has two pockets 18 and 20 which are aluminised to provide reflective surfaces and which have respective rear apertures 22 and 24 for receiving light bulbs in use. The reflector body 16 is mounted in the housing 10 by means of a mounting system which includes three universal pivots 26, 28, and 30. The universal pivot 26 is defined by a ball-and-socket joint wherein the ball is mounted on a post 32 fixedly secured to the inside of the housing 10. The universal pivot 28 is defined by a ball-and-socket joint which is disposed vertically above the universal pivot 26 and whose ball is provided on the end of a horizontal, externally screw-threaded rod 34. The rod 34 projects rearwardly of the reflector body 16 so as to engage with an internally screw-threaded bush 26 fixed to the housing 10. The rearward end of the rod 34 is disposed externally of the housing 10 and terminates in a knob 38 to facilitate manual rotation of the rod 34.

The third universal pivot 30 is spaced horizontally from the first universal pivot 26 and has a horizontal screw-threaded rod (not shown) associated therewith in a similar manner to rod 34. It will be appreciated that manual rotation of rod 34 effects tilting movement of the reflector body 16 relative to the housing 10 about a horizontal axis passing through the centres of the universal pivots 26 and 30, whilst rotation of the rod associated with the third pivot 30 effects tilting movement of the reflector body 16 about a vertical axis passing through the centres of the first and second universal pivots 26 and 28.

Mounted on the top surface of the housing 10 is a pair of bearings 40 aligned in the fore-and-aft direction of the housing 10. An element in the form of an L-shaped rod 42 has its longer limb slidably mounted in the aligned bearings 40. The longer limb of the rod 42 terminates adjacent the front cover 12 in a part-spherical abutment 44. The shorter limb of the L-shaped rod 42 has a free end which is engaged with a grooved region 46 of the rod 34. The engagement is such that rotation of the rod 34 relative to the shorter limb of the rod 42 is permitted, but linear movement of the rod 34 is accompanied by linear movement of the rod 42. Thus, the position of the abutment 44 in the fore/aft direction of the housing 10 indicates the degree of tilt of the reflector body 16 upon adjustment of screw-threaded rod 34 about the aforesaid horizontal axis.

Projecting from below the lower part of the housing 10 is a horizontally directed, forward facing fixed post 48 whose forward end defines a part-spherical fixed abutment 50.

The fixed post 48 is secured to the underside of the housing 10 vertically below the rod 42. A further L-shaped rod 52 whose forward end terminates in a part-spherical abutment 54 passes slidably through bearings 56 (only one shown) fixed to the underside of the housing 10. The shorter limb of the rod 52 engages with the screw-threaded rod associated with the universal pivot 30 in a like manner to that described above for the L-shaped rod 42. The rod 52 is horizontally spaced from the fixed post 48.

When it is desired to aim the headlamp mechanically without visual reference to the beam, by the use of a mechanical aimer, an adaptor is first attached to the headlamp. Such adaptor is illustrated in FIGS. 3 and 4 and comprises a triangular adaptor plate 60 having three legs of which only 2 are shown at 62 and 63. The legs terminate in spherically concave free ends which engage with the respective abutments 44, 50 and 54. Thus, the concave end of leg 62 engages with abutment 44 whilst the concave ends of the remaining legs engage with the respective fixed abutments 50 and 54. The adaptor is held against such abutments by means of a suction pad 66 which is mounted on the plate 60 via a universal joint and a mounting tube 68 whose interior communicates with the pad 66. The mounting tube 68 communicates with a region of the plate 60 which is engaged by a lever-controlled suction pad on the mechanical aimer itself and so operation of the lever causes both suction pads to be controlled. It will be appreciated that the angle of tilt of the plate 60 about a horizontal axis corresponds to the angle of tilt of the reflector body 16 about the horizontal axis, as determined by the axial position of the screw-threaded rod 34; and likewise for rotating of the reflector body about a vertical axis. Thus, the headlamp can be aimed mechanically using the mechanical aimer, e.g. as specified in US Lighting Standard SAE J602, attached to the adaptor plate 60. A scale on the beam aimer indicates the orientation of the reflector body 16.

In the embodiment illustrated in FIG. 5, similar parts are accorded the same reference numerals. However, in this embodiment, only one bearing 40 is provided at the top of the housing 10 and the rod 42 is pivotally attached at its rearward end to a flange 70. The flange 70 is secured to the top of the reflector body 16 and projects through a slot 72 in the top wall of the housing 10. The slot 72 is sealed against ingress of dirt and moisture. In this embodiment, rod 34 is rotated using knob 38 via a bevel gear arrangement 74. Monitoring of the tilted position of the reflector body 16 about the vertical axis is effected in a like manner.

In the embodiment of FIG. 6, the arrangement is similar to that of FIG. 5 except that the bevel gear arrangement 74 is omitted.

In the embodiments of FIGS. 5 and 6, headlamp aiming is effected in a similar way to that described above with reference to FIGS. 3 and 4.

What is claimed:

1. A headlamp comprising a housing including a light-transmitting front cover, said housing being adapted to be fixed to a motor vehicle, a lamp reflector body mounted within said housing, and mounting means operatively connected between said lamp reflector body and said housing for adjustably mounting said lamp reflector body within said housing, said mounting means including an adjuster which is connected with said lamp reflector body so that adjustment thereof tilts said lamp reflector body about a substantially horizontal axis, characterised in that an element is mounted externally of said housing and connected for movement with said lamp reflector body, said element extending forwardly of said housing and mounting an abutment which is disposed at the front of said housing, whereby the position of said abutment relative to said housing is dependant upon the tilted position of said lamp reflector.

2. The headlamp according to claim 1, in combination with an adaptor which is adapted to be temporarily pivotally mounted on said headlamp, said adaptor having a surface adapted to engage against said abutment so that tilting of said lamp reflector body by operating said adjuster produces a corresponding tilting movement of said adaptor and part of a mechanical aimer when attached thereto in use.

3. The headlamp according to claim 1, wherein said element is connected with said lamp reflector body via a portion of said adjuster which is disposed externally of said housing.

4. The headlamp according to claim 1, wherein said element is connected with said lamp reflector body via a member which is mounted on said lamp reflector body and which extends through a slot provided in said housing.

5. The headlamp according to claim 4, wherein sealing means are provided to seal said housing around said slot.

6. The headlamp according to claim 1, wherein said element comprises an L-shaped rod having one limb slidably mounted in least one bearing mounted on said housing, the other limb being engaged with said adjuster.

7. The headlamp according to claim 6, wherein said adjuster comprises a screw-threaded rod mounted in an internally screw-threaded bush fixed relative to said housing, said screw-threaded rod acting against said lamp reflector body.

8. The headlamp according to claim 1, wherein said element comprises a rod slidably mounted in a bearing mounted on said housing and pivotally attached to part of a flange which is secured to said reflector body, said part being that which projects externally of said housing.

9. The headlamp according to claim 2, wherein said abutment and said element are provided at a top of said housing, whilst a fixed abutment for said adaptor is provided at the bottom of the housing.

* * * * *